US008755506B2

(12) United States Patent
Singh et al.

(10) Patent No.: US 8,755,506 B2
(45) Date of Patent: Jun. 17, 2014

(54) SYSTEM AND METHOD FOR PROVIDING CALL AND CHAT CONFERENCING

(75) Inventors: Amit Singh, Irving, TX (US); Fariborz Ebrahimi, Arlington, VA (US); Dinyar Kavouspour, Plano, TX (US); Bipin Sakamuri, Irving, TX (US); Amar Nageswaram, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1453 days.

(21) Appl. No.: 11/770,969

(22) Filed: Jun. 29, 2007

(65) Prior Publication Data

US 2009/0003576 A1  Jan. 1, 2009

(51) Int. Cl.
*H04M 3/42* (2006.01)
*H04M 11/00* (2006.01)
*H04M 1/00* (2006.01)
*H04L 12/16* (2006.01)
*H04Q 11/00* (2006.01)

(52) U.S. Cl.
USPC .......... 379/202.01; 379/93.21; 379/158; 379/201.01; 379/201.1; 370/260; 455/416

(58) Field of Classification Search
USPC .......... 379/202.01, 205.01, 88.14, 90.01, 379/93.01, 93.21, 157, 158, 201.01, 379/207.01; 370/259, 260, 261, 262; 455/414.1, 416; 348/14.01, 14.02, 348/14.03, 14.04, 14.05, 14.06, 14.07, 348/14.08, 14.09, 14.1, 14.11, 14.12, 14.13, 348/14.14, 15.15, 14.16
See application file for complete search history.

(56) References Cited

U.S. PATENT DOCUMENTS

| 5,712,901 | A  | * | 1/1998 | Meermans | 379/88.14 |
|---|---|---|---|---|---|
| 6,546,366 | B1 | * | 4/2003 | Ronca et al. | 704/260 |
| 7,298,831 | B1 | * | 11/2007 | Keohane et al. | 379/88.23 |
| 2002/0037074 | A1 | * | 3/2002 | Dowens et al. | 379/88.14 |
| 2004/0057562 | A1 | * | 3/2004 | Myers et al. | 379/88.14 |
| 2004/0203677 | A1 | * | 10/2004 | Brown et al. | 455/416 |
| 2004/0263636 | A1 | * | 12/2004 | Cutler et al. | 348/211.12 |
| 2005/0216549 | A1 | * | 9/2005 | Amano et al. | 709/202 |
| 2007/0071206 | A1 | * | 3/2007 | Gainsboro et al. | 379/168 |
| 2007/0156811 | A1 | * | 7/2007 | Jain et al. | 709/204 |
| 2007/0276913 | A1 | * | 11/2007 | Olson et al. | 709/206 |
| 2008/0137558 | A1 | * | 6/2008 | Baird | 370/260 |

\* cited by examiner

*Primary Examiner* — Khai N Nguyen (57) ABSTRACT

An approach is disclosed for providing an integrated call and chat conferencing system. A first participant joins in a conference, wherein the first participant communicates over a voice session. The voice session is converted into a text stream and stored. A second participant joins in the conference, wherein the second participant communicates over a chat session. The stored converted text stream is presented to second participant.

20 Claims, 7 Drawing Sheets

SYSTEM AND METHOD FOR PROVIDING CALL AND CHAT CONFERENCING

BACKGROUND INFORMATION

Conferencing systems play a vital role in business operations, enabling cost-effective and timely exchange of communications over diverse geographic locations. Conventional conferencing systems are largely based on telephony applications. With the emergence of sophisticated data communication applications and the convergence of data and voice systems, users are offered a host of methods for communicating. For example, instant messaging (IM) has enjoyed enormous popularity as an effective form for communicating in informal settings. However, for business purposes, IM applications are still in their infancy, particularly with respect to conferencing.

Based on the foregoing, there is a clear need for a conferencing system that can integrate voice and data applications.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF PREFERRED EMBODIMENTS

An apparatus, method, and software for providing integrated call and chat conference are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to chat or instant messaging applications, it is contemplated that these embodiments have applicability to other equivalent applications.

Figure 1:
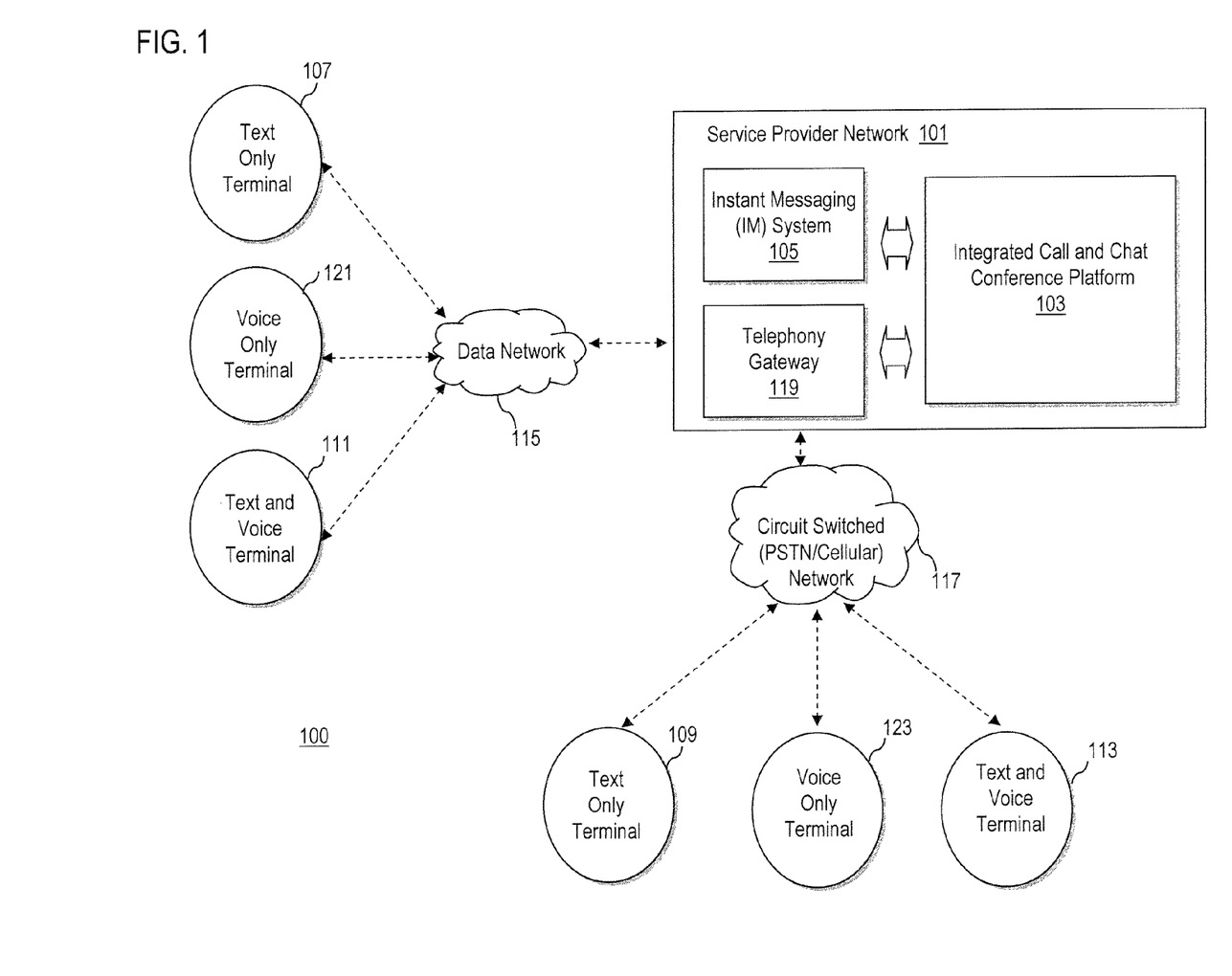
FIG. 1 is a diagram of a communication system including an integrated call and chat conference platform, according to various exemplary embodiments.

FIG. 1 is a diagram of a communication system including an integrated call and chat conference platform, according to various exemplary embodiments. For the purposes of illustration, a communication system 100 includes a service provider network 101 that employs an integrated call and chat conference platform for providing conferencing functionalities. The platform 103 integrates both voice sessions and chat sessions seamlessly so that participants in a conference can communicate using voice-base and chat-based technologies.

An instant messaging (IM) (or instant communication) system 105 facilitates establishment of instant messaging (or chat) sessions among users. The IM system 105 process messages, such as text messages, between endpoints. In this example, the endpoints include text only terminals 107, 109 as well as text and voice terminals 111, 113. The text only terminals 107, 109, according to one embodiment, include computing devices (include desktop personal computers, workstations, web appliances, personal digital assistants (PDAs), palm computers, etc.) without any capability to conduct a voice call, but are loaded with IM (or other equivalent) applications for chatting. The text and voice terminals 111, 113 possess applications that support both voice and IM communications, and thus, can include, e.g., cellular phones, desktop personal computers, workstations, web appliances, PDAs, palm computers, etc.

The IM platform 101 also includes a presence server (not shown) to determine which terminals 107, 109, 111 and 113 are online. Because of the immediate or instant nature of the communication, instant messaging service requires presence information or availability of the users. The terminals 107, 109, 111 and 113 send presence information (e.g., presence messages) over a data network 115 and a circuit switched network (e.g., public switched telephone network (PSTN) or cellular network) 117 to the presence server to indicate state of the terminals 107, 109, 111 and 113. The data network 115 can be an internetwork that includes the global Internet. This presence information is updated periodically.

As seen, a telephony gateway 119 is utilized to process voice sessions from a voice only terminal 121 within the data network 115, or voice calls originating from the circuit switched network 117 by a voice only terminal 123. The voice only terminal 121, which operates over the data network 115, can be a voice over Internet Protocol (IP) (VoIP) terminal, while the voice only terminal 123 can be a POTS (Plain Old Telephone Service) phone, for example.

In this example, one or more text based terminals 107, 109, 111 and 113 participate in a conference over the integrated call and chat conference platform 103. Additionally, one or more voice only terminals 121, 123 and text and voice terminals 111, 113 participate in the conference via the integrated call and chat conference platform 103 by connecting to the platform 103 over the data network 115 or the PSTN/cellular network 117.

The integrated call and chat conference platform 103 captures voice and text conversations and present this exchange back to the users in the other format. When a user on the voice only terminal 123, for instance, talks, the voice is converted to text and is presented in the chat conversation for all participants to the conference to view. When a user on the text only terminal 107 "chats," the text is converted to audio signals and read out to the participants who are using the phone call conference but not present in the text conference. The integrated call and chat conference platform 103 permits, at a later stage, readily reviewing and conducting actions related to chat or voice conversation.

The value of the integrated call and chat conference platform 103 can be appreciated by considering a typical business scenario. With large multinational companies, it is common for companies to incur the cost of sending their employees on business trips to various locations around the world. During this time, however, these employees may also need to participate in corporate meetings that may be phone based, chat-based or a combination any of these forms. While attending a chat-based meeting, all participants of the meeting has access to a text entering device such as a personal computer (PC), personal digital assistant (PDA), or any mobile device with text capability. It is essentially not viable for an individual to attend a chat-based meeting without access to a text entering device. Similarly, it is infeasible for an individual to attend a meeting that is both phone based and chat-based using only a phone or using only a text based console as only one form of communication is traditionally supported.

Conventional approaches to conferencing do not provide the ability for the user to participate in voice based conversations if user has joined the conference with text based communication. Similarly, for an individual joining the conference with only voice based communication, the user will have no means of participating in the text based communication.

The platform 103 additionally addresses the need for storing the voice conversations for later retrieval by chat-based users. For a chat user who is joining the conference at a later time, the user has no immediate way of finding out what was discussed during the voice based conference session. The only recourse is to obtain such information from a participant, which may not be accurate or complete (e.g., the participant may only be concerned with a topic that is not relevant to the new participant, and vice versa). Also, attempting to "catch-up" with the conference can disrupt the other user's participation. Consequently, in view of this drawback, the platform 103 stores communications sessions, both voice based and chat based, for subsequent access, as more fully described with respect to FIG. 2.

Figure 2:
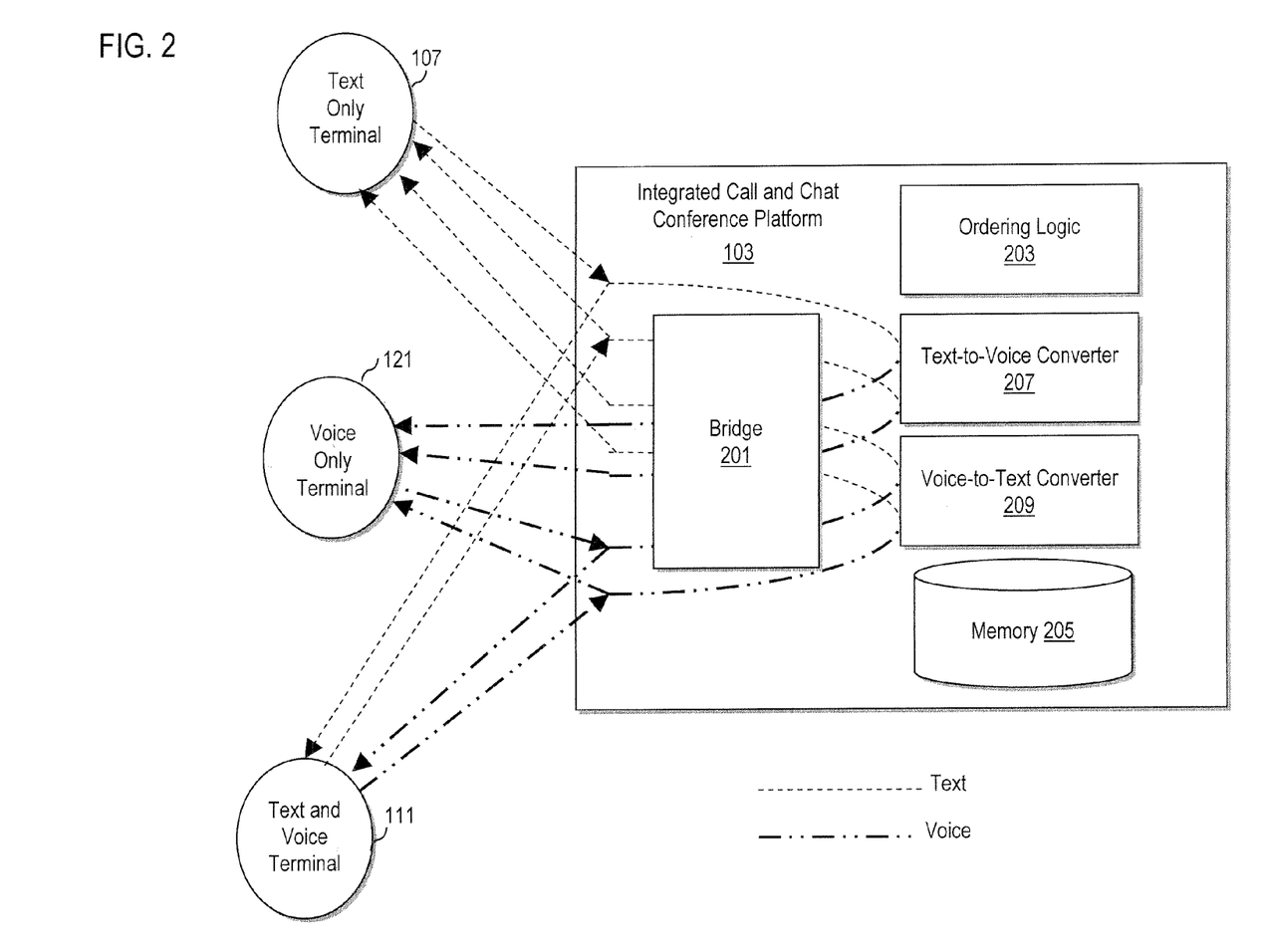
FIG. 2 is a diagram of the integrated call and chat conference platform in the system of FIG. 1, according to an exemplary embodiment.

FIG. 2 is a diagram of the integrated call and chat conference platform in the system of FIG. 1, according to an exemplary embodiment. The platform 103 of FIG. 1, in one embodiment, has a bridge 201 for receiving voice sessions and chat sessions from the terminals 107, 111, and 121. These communication sessions, which are received during the conference, are sorted by ordering logic 203. The ordering algorithm, in an exemplary embodiment, can be designed based on priority of the message received or even based on the usage of the platform 103. Furthermore, the message transmission start time, or the end time can be considered for ordering the communications. When a communication session from anyone of the terminals 107, 111, and 121 is received at the integrated call and chat conference platform 103, the data, in an exemplary embodiment, is stored in its original form within a memory (e.g., database) 205. The various communications that are received are also ordered before they are stored. For example, the duration or even end time of the communication can be used to order the received communications from various participants; other ordering algorithms or schemes may also be used based on the semantics of the communications.

The conference platform 103 also comprises a text-to-voice converter 207 converting text into speech. When text based communication is received from either the text only terminal 107 or the text and voice terminal 111, the text can be converted into voice via a text-to-voice converter 207 so that the voice only terminal 107 may be able to gain access to the content of the communication.

Additionally, the conference platform 103 also comprises of a voice-to-text converter 209 that converts speech into text. When voice based communication is received from either the voice only terminal 107 or the text and voice terminal 111, it can be converted into text via the voice-to-text converter 209, wherein the text only terminal 107 can access to the content of the communication. The text-to-voice converter 207 and voice-to-text converter 209 can be implemented using such tools as Microsoft® Speech API (Application Programming Interface) within the conference platform 103. Placement of these converters 207 and 209 may, for example, depend on the performance of the platform and the amount of storage available.

It is noted that communication sessions received by the conference platform 103 needs to be converted to another form of communication multiple times, decreasing the post communication performance of the system. Depending on the storage capacity of the memory 205, all the messages received can be converted to both voice as well as text for storage using the voice-to-text converter 209 and text-to-voice converter 207, respectively. In such an exemplary embodiment, this eliminates the need to convert the messages to another form of communication for every usage.

Figure 3:
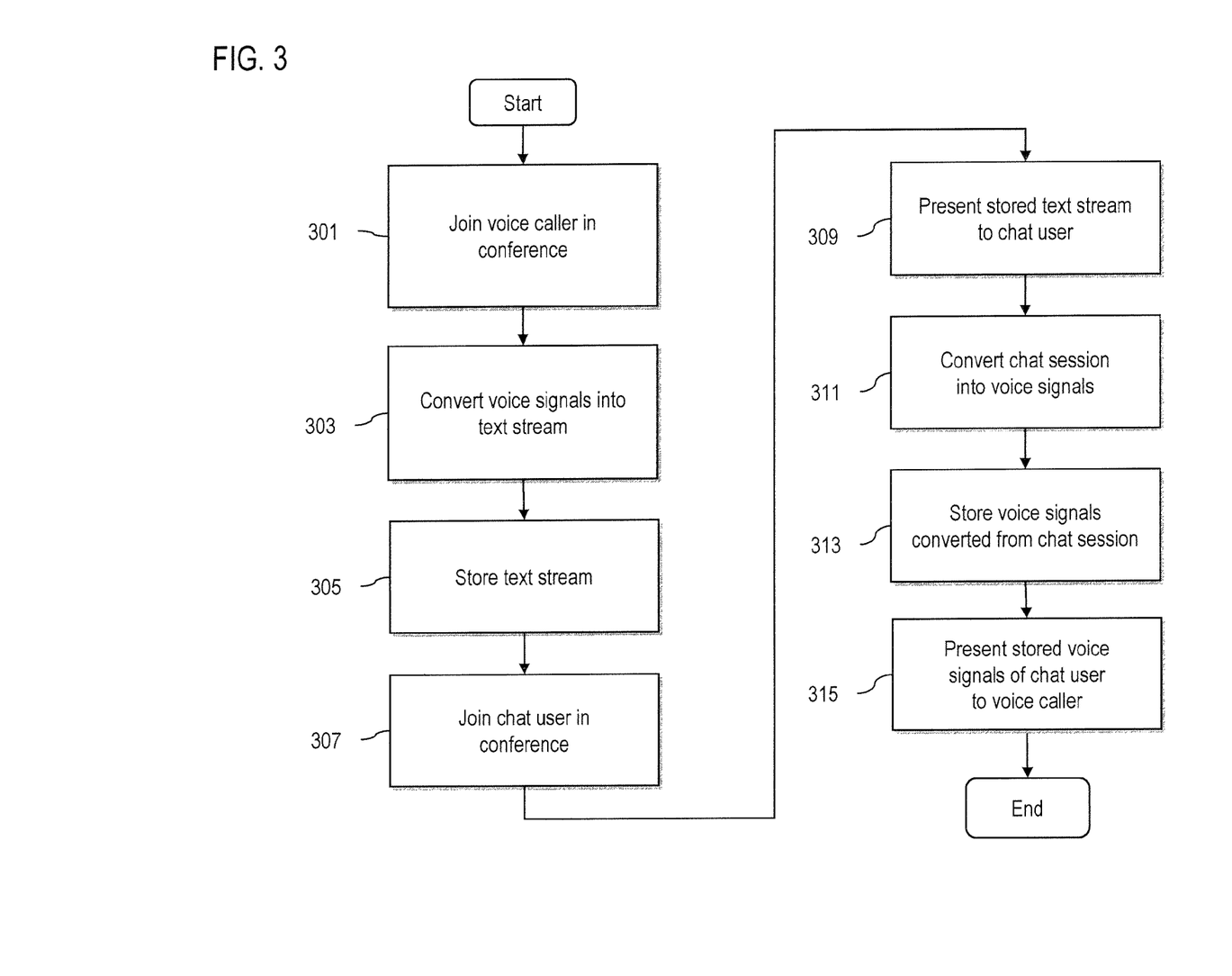
FIG. 3 is a flowchart of a process for participating in a conference, according to an exemplary embodiment.

FIG. 3 is a flowchart of a process for participating in a conference, according to an exemplary embodiment. In step 301, a voice caller, e.g., using terminal 111, is joined to a conference established by the integrated call and chat conference platform 103. The voice signals are converted by the voice-to-text converter 209 into a text stream, per step 303. The converted voice signals are then stored in memory 205 (step 305).

Next, another user, this time a chat user (e.g., terminal 107), enters the conference, as in step 307, at a later point in time. In step 309, the platform 103 presents the stored text stream corresponding to the terminal 111 to this chat user on terminal 107. The chat user can also provide input into the conference by submitting text communication; such chat session is converted by the text-to-voice converter 207 (step 311), and stored (step 313). This stored voice signals of the chat user can be presented to the voice caller—i.e., terminal 111 (step 315).

The approach described herein has the ability to support both voice and text based communication as well to store voice conversations that have occurred during a meeting. Furthermore, the platform 103 has the capacity to convert text-to-voice and voice-to-text. The ability to store voice communications in both voice and text form helps individuals joining the conference at a later point in time to hear or read the communication that has occurred. That is, all voice conversations that take place during the conference are converted to text for individuals who join the conference using the text only mode. Similarly, textual conversations that transpire during the conference are converted to voice for individuals who join the conference using the voice only mode.

The above process enables individuals who join in the conference at a later time to gain access to the history of the text and voice based communications that have occurred during the conference in real-time. This also eliminates the communication block that exists between parties who join a conference using the text only mode and those who join in voice only mode.

Figure 4:
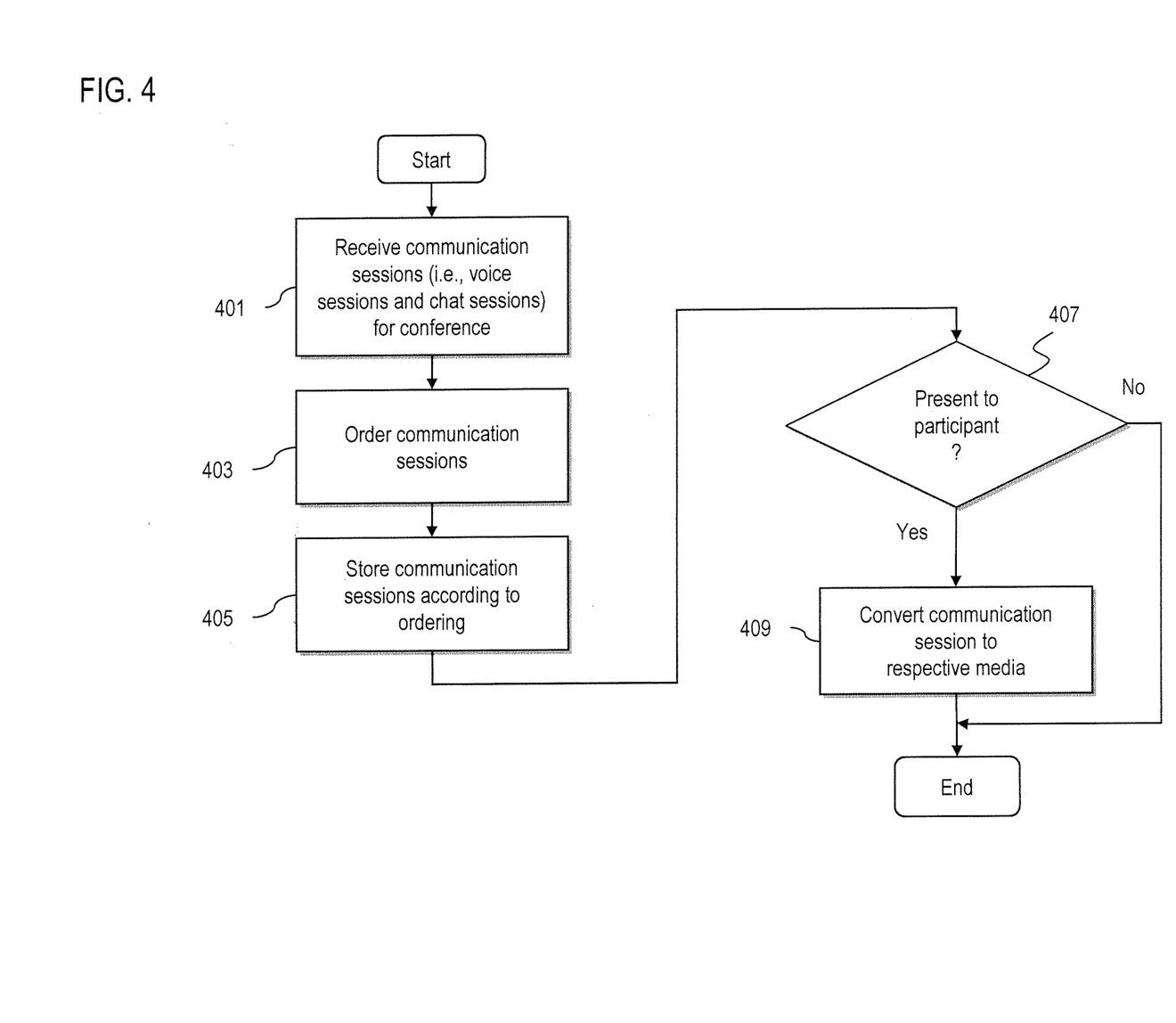
FIG. 4 is a flowchart of a process for ordering and storing communication sessions of the integrated call and chat conference platform of FIG. 1, according to an exemplary embodiment.

FIG. 4 is a flowchart of a process for ordering and storing communication sessions of the integrated call and chat conference platform of FIG. 1, according to an exemplary embodiment. To elaborate further on the ordering logic 203 operations, when communication sessions (both voice and chat) are received by the integrated call and chat conference platform 103 through the IM system 105 and the telephony gateway 119, such sessions are ordered for processing (steps 401 and 403). Storage of these sessions is also dictated by this ordering scheme (step 405). In this example, the communication sessions are stored unconverted, until users requiring differing formats are detected, at which point the conversion of the communication session to the respective media is performed (steps 407 and 409).

In the alternative, at any point, multiple participants can drop in and out of the conference. Therefore, to reduce potential delays to delivery of converted media to the participants, the conversion of the communication sessions can be processed by the converters 207 and 209 in real-time and then stored.

With the above process, the entire history of the conference can be accessed by chat users as well as voice calls, even though a user enters the conference subsequent to the starting point.

Figure 5:
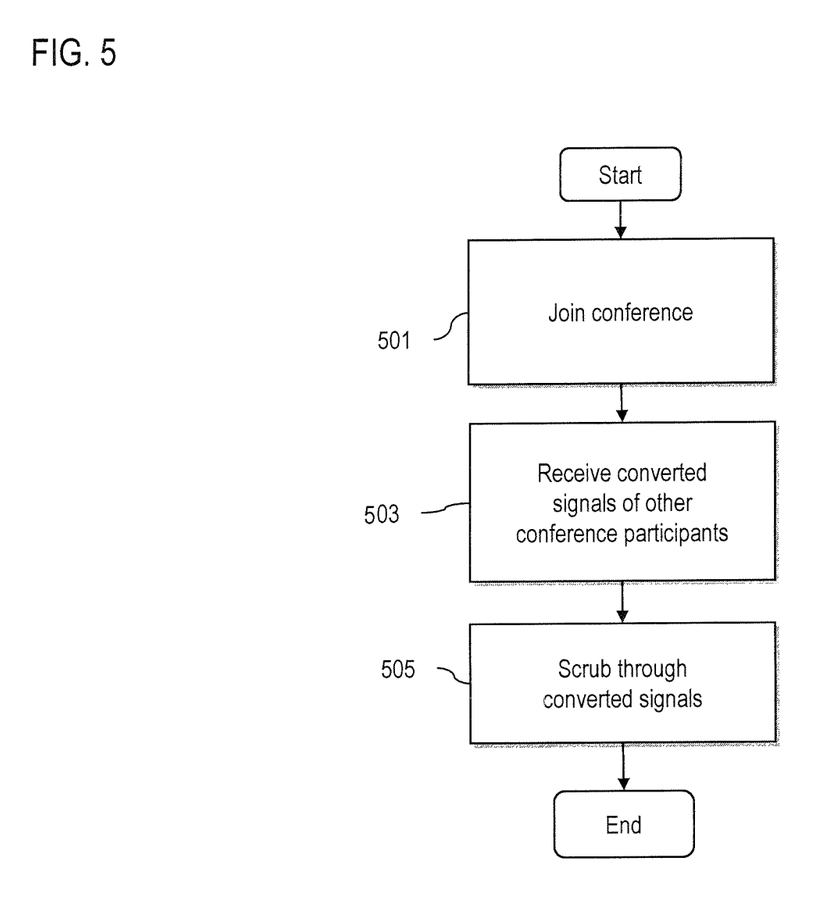
FIG. 5 is a flowchart of a process for permitting scrubbing through media streams provided by the integrated call and chat conference platform of FIG. 1, according to an exemplary embodiment.

FIG. 5 is a flowchart of a process for permitting scrubbing through media streams provided by the integrated call and chat conference platform of FIG. 1, according to an exemplary embodiment. In steps 501 and 503, a user joins the conference and receives the converted signals of the other participants. That is, if the user is a chat user, a text stream representing the converted voice session is presented to the user's chat interface. However, if the user is a voice caller, converted text in form of audio signals is provided. In either case, the user can "scrub" (advance back and forth) through the converted media at the user's convenience, as in step 505, enabling the user to focus in on important or critical points in the conference that the user may have missed (or wish to listen to again). In the case of the voice caller, this mechanism can be provided by the platform 103 in a manner that during playback of the converted voice signals, the voice terminal (e.g., terminals 111 and 121) can control the playback with using keypad inputs for such functions as pause, rewind, fast forward, play, etc.

With respect to the chat user, the text stream representing the voice call can simply be presented as a transcription of the conference; such transcription can be scrolled through on the chat interface.

Figure 6:
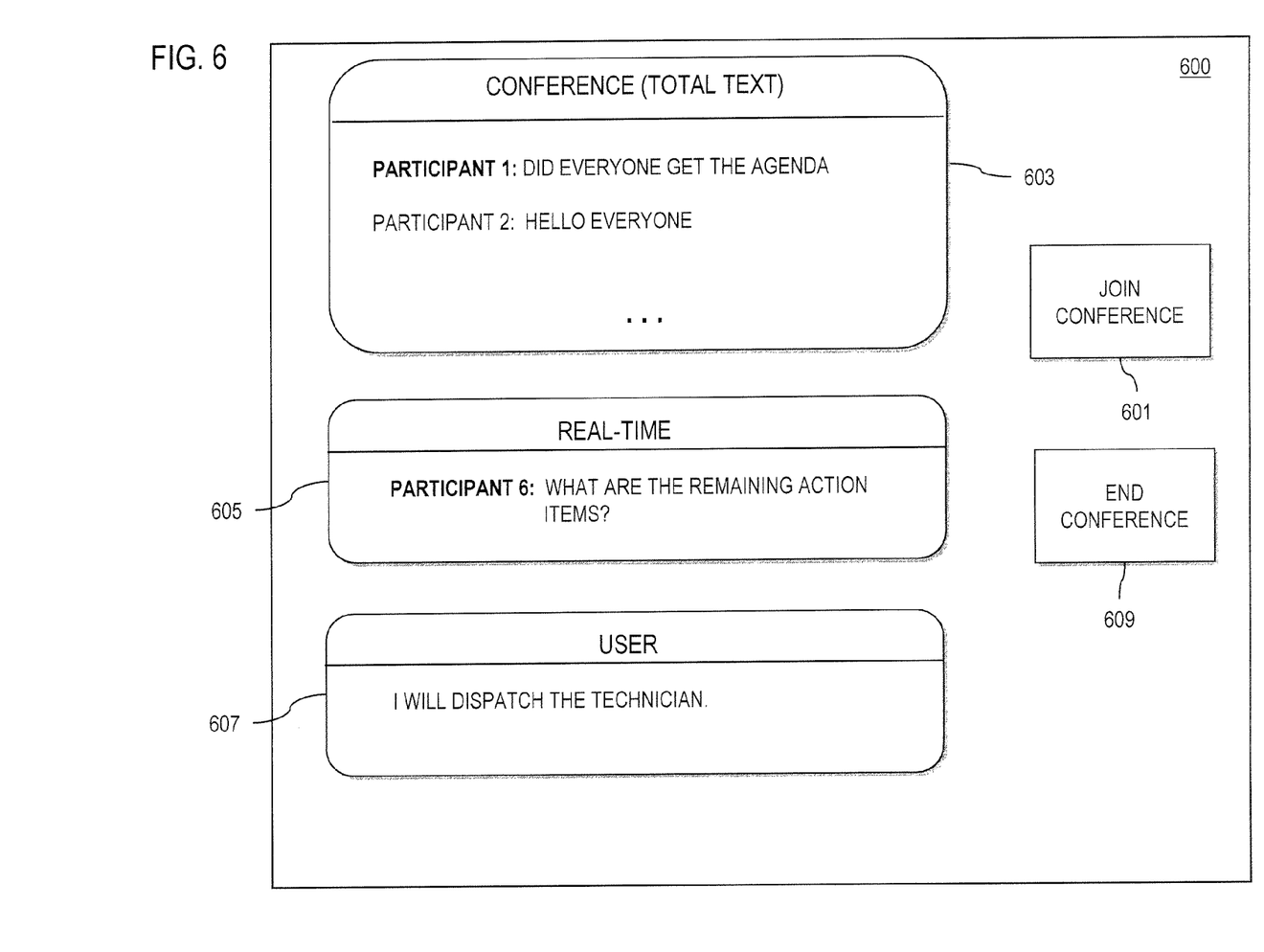
FIG. 6 is a diagram of a graphical user interface (GUI) of a chat interface for participating in an integrated conference, according to an exemplary embodiment.

FIG. 6 is a diagram of a graphical user interface (GUI) of a chat interface for participating in an integrated conference, according to an exemplary embodiment. An exemplary GUI 600 is provided by an IM application resident on the terminal 107, for instance. It is assumed that the terminal 107 has joined the conference after the meeting has begun, in which the user initiates using the Join Conference button 601. At this point, the IM system 105 is aware that the chat user requires all the communications that have transpired; this is presented in a text box 603 of the history of the conference. For example, Participant 1 is a voice caller and Participant 2 is another chat user. The platform 103 provides a conversion of all of the Participant 1's communications. A separate box 605 shows the conference in real-time. In this example, Participant 6 is yet another voice caller, whose voice communications has been converted to text for viewing by the chat users. Another text 607 can be presented as an input bar for the chat user of the GUI 600.

The user can end participation in the conference using an End Conference button 609.

The above described processes relating to integrated conferencing may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
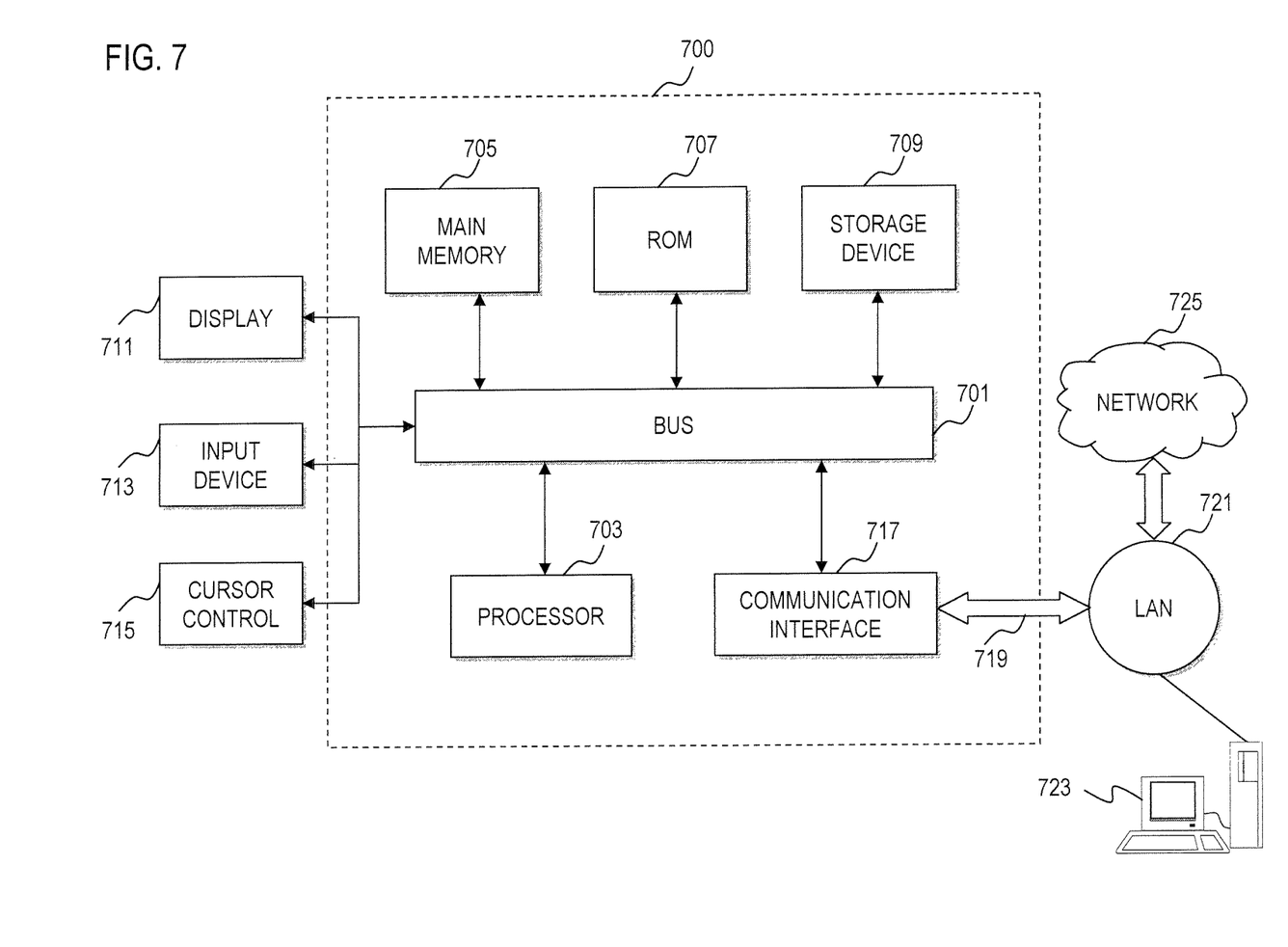
FIG. 7 is a diagram of a computer system that can be used to implement various exemplary embodiments.

FIG. 7 illustrates a computer system 700 upon which an exemplary embodiment can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the exemplary embodiment. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc.

Although a single communication interface 717 is depicted in FIG. 7, multiple communication interfaces can also be employed.

The network link 719 typically provides data communication through one or more networks to other data devices. For example, the network link 749 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
    joining a first participant, configured over an integrated call and chat conference platform, in a conference, wherein the first participant communicates over a voice session;
    converting the voice session, including a first communication by the first participant, into a text stream;
    storing the text stream; and
    joining a second participant, configured over the integrated call and chat conference platform, in the conference after an occurrence of the first communication,
    wherein the second participant communicates over a chat session and a presence server determines that the second participant is online,
    wherein presence information is updated periodically, and
    wherein the stored text stream is presented to the second participant during the conference for viewing.

2. The method according to claim 1, further comprising:
    converting the chat session, including a second communication by the second participant, into voice signals;
    storing the voice signals; and
    presenting the voice signals to the first participant.

3. The method according to claim 2, further comprising:
    joining a third participant in the conference after an occurrence of the second communication, wherein the voice signals are presented to the third participant based on a communication session type used by the third participant.

4. The method according to claim 2, wherein the first participant can scrub through the voice signals and the second participant can scrub through the text stream.

5. The method according to claim 2, wherein the second participant communicates over a chat interface configured to display one point of the text stream in one text box, and another point of the text stream in another text box.

6. The method according to claim 2, wherein the voice session and the chat session are continually converted for duration of the conference.

7. The method according to claim 1, further comprising:
    ordering communications sessions, including the voice session and the chat session, to prioritize storage of the communication sessions.

8. The method according to claim 1, wherein the voice session originates from a voice terminal over either a circuit-switched network, a cellular network, or a data network.

9. The method according to claim 1, wherein the chat session originates from a text terminal over either a circuit-switched network, a cellular network, or a data network.

10. The method according to claim 1, wherein the voice session is stored as unconverted signals, and subsequently converted when the text stream is to be presented to the second participant.

11. An apparatus comprising:
an integrated call and chat conference platform configured to join a first participant in a conference, wherein the first participant communicates over a voice session;
a voice-to-text converter configured to convert the voice session, including a first communication by the first participant, into a text stream; and
a memory configured to store the text stream,
wherein the integrated call and chat conference platform is further configured to join a second participant in the conference after an occurrence of the first communication, the second participant communicating over a chat session and a presence server determines that the second participant is online,
wherein presence information is updated periodically, and
wherein the stored text stream is presented to the second participant during the conference for viewing.

12. The apparatus according to claim 11, further comprising:
a text-to-voice converter configured to convert the chat session, including a second communication by the second participant, into voice signals, wherein the memory is further configured to store the voice signals, and the stored voice signals are transmitted to the first participant.

13. The apparatus according to claim 12, wherein the bridge is further configured to join a third participant in the conference after an occurrence of the second communication, wherein the voice signals are presented to the third participant based on a communication session type used by the third participant.

14. The apparatus according to claim 12, wherein the first participant can scrub through the voice signals and the second participant can scrub through the text stream.

15. The apparatus according to claim 12, wherein the second participant communicates over a chat interface configured to display one point of the text stream in one text box, and another point of the text stream in another text box.

16. The apparatus according to claim 12, wherein the voice session and the chat session are continually converted for duration of the conference.

17. The apparatus according to claim 11, further comprising:
ordering logic configured to order communications sessions, including the voice session and the chat session, to prioritize storage of the communication sessions.

18. The apparatus according to claim 11, wherein the voice session originates from a voice terminal over either a circuit-switched network, a cellular network, or a data network.

19. The apparatus according to claim 11, wherein the chat session originates from a text terminal over either a circuit-switched network, a cellular network, or a data network.

20. The apparatus according to claim 11, wherein the voice session is stored as unconverted signals, and subsequently converted when the text stream is to be presented to the second participant.

* * * * *